July 14, 1964

C. K. COOPER ETAL 3,140,701

FUEL REGULATING INTAKE VALVE

Filed Jan. 22, 1963

INVENTORS
THOMAS E. SPEIGHT
CARLTON K. COOPER

BY *McCarthy, Depaoli & O'Brien*

ATTORNEYS

United States Patent Office 3,140,701
Patented July 14, 1964

3,140,701
FUEL REGULATING INTAKE VALVE
Carlton K. Cooper and Thomas E. Speight, Gallup,
N. Mex., assignors to El Paso Natural Gas Products
Company, a corporation of Texas
Filed Jan. 22, 1963, Ser. No. 253,109
7 Claims. (Cl. 123—120)

The present invention relates to a fuel regulating intake valve, suitable for use in gas engines of the internal combustion type. It has particular application to the intake valves for large internal combustion gas engines, particularly of the types which require metering of fuel gas on each cycle as the gas combines with air in the engine intake mixture.

Internal combustion engines, especially those of reciprocating or piston type, which operate on natural gas and similar gaseous or gas operating fuels, are used on a large scale, particularly in areas where such fuels are widely available and economical. Thus, in areas where, or near where, natural gas is produced in large quantities, or in large coke producing areas where combustible gases are a large and economical by-product, the use of large and powerful gas burning engines of these types is widespread. In general, gas engines are built in large units. They are usually piston operated or reciprocating engines which are designed for long continuous runs although gas turbines are widely used too. Units of either type must be rugged and dependable.

At the same time, gas engines of the internal combustion reciprocating type should be, and usually are, so designed that compensation may be made in some manner for wear of at least the mechanical moving parts which are most subject to wear. This is necessary to maintain continuous or semi-continuous operation. In piston type, reciprocating valve, operated engines, which are the predominant kinds used in this service, the valve parts themselves are often particularly subject to wear. Adequate lubrication is difficult at the operating temperatures involved. Also, the fuels often contain sulfur and other corrosive materials which promote corrosion of the engine parts in general and promote valve corrosion and wear in particular. These engines usually operate at rather high temperatures as well as at heavy loads. All these conditions tend to promote wear, particularly of valves, valve operating parts and associated trains and mechanisms.

In certain widely used types of valve operated reciprocating gas engines, the intake valve mechanism is relatively complex. It serves not only to admit a fuel and air mixture into a combustion chamber but parts of the same mechanism serve also to meter the gaseous fuel into a zone for admixing with air, which zone is just ahead of the combustion zone. Valve systems in engines of this type are built to be rugged and dependable in most respects but they are sometimes deficient, particularly in their fuel metering function. This function requires mechanical parts of high precision. Since the intake valve proper is always subject to some wear, it must frequently, or at least occasionally, be adjusted, reground, etc., and sometimes refaced and/or reseated. By virtue of the unitary relationship between the gas metering elements of the mechanism and the intake valve head, per se, these adjustments and resurfacing operations tend to interfere seriously with proper fuel metering. A regrinding of the main valve may cause malfunctioning or misadjustment of the fuel metering elements.

Thus, in an engine such as the Worthington SLHC, as one example, a number of adjustments of parts which function for proper gas metering may be involved whenever an adjustment, a grinding, or a resurfacing of the valve head itself or of the valve seat, is accomplished.

A primary object of the present invention is to simplify and facilitate the gas metering adjustment in such cases.

More specifically, in an engine of the general type just mentioned, the intake valve is commonly provided with a piston, formed integrally with the valve stem. As the valve opens and closes, the piston also opens and closes, in proper timed relationship, certain metering ports to admit fuel gas into the zone ahead of the actual engine intake where such gas is mixed with air. From the mixing zone, the mixture then enters the combustion zone through the conventional intake valve opening. The piston usually is mounted on and permanently affixed to the valve stem, commonly being an integral part of the stem. It cooperates with a more or less precisely positioned metering valve guide comprising a gas flow control port, which guide includes a sharply defined "metering port edge." If the main intake valve is ground or otherwise resurfaced, the effective relative position in space of the metering piston is usually changed slightly. Also, its operating position with respect to the meter port parts, as well as its position with respect to the new effective surface of the intake valve, may be changed enough to interfere with proper fuel metering.

Conventional metering valve arrangements of this type are often provided with at least some elements which can be displaced in space, e.g., by an adjustment means in the form of removable or replaceable shims for the valve guide. The metering piston, formed integrally with the valve stem (or welded thereto if desired), and the cooperating valve guide, which is provided with the critically positioned gas outlet including the so-called "metering port edge" or cut-off surface, are made relatively adjustable in certain minimum increments by the use of shims. Finer adjustments than the shims permit may necessitate a milling or grinding operation on the valve guide or on the valve guide seat on which it is supported, or on both. Such adjustments are obviously of considerable inconvenience, in many instances at least.

Even when very thin shims are used, it is difficult to obtain correct adjustments. To some extent, control of gas flow through the gas manifold of an engine may be controlled by one or more gas pressure reducers installed in the manifold system. In a typical engine a misplacement caused by wear or misadjustment of the guide metering port edge as small as $\frac{1}{5000}$ of an inch may necessitate increasing the feed gas pressure by three pounds per square inch to compensate and to make the proper combustible mixture. A specific object of this invention, then, is to provide an improved, more convenient and highly accurate adjustment means for regulating or metering the gas flow to the intake mixture zone in engines of the general type described above. It is obviously desirable not only to obtain sufficient accuracy of gas metering but also to avoid the necessity of frequently adjusting the input gas pressure to the manifold.

Aside from the question of proper and accurate metering of fuel gas to a particular cylinder or combustion zone of an engine, there is the problem of maintaining a proper balance of fuel intake quantities in the several cylinders of multi-cylinder engines. Firing pressure of all cylinders must be equalized for smooth operation of such an engine. In conventional engines the usual adjustment is that accomplished through the gas manifold throttle valve. This, however, adjusts the gas pressure alike for all the cylinders supplied by such throttle valve. It would be preferable to be able to make such adjustments individually for each cylinder, e.g., by vertical adjustment of the metering piston of a particular system. It is the relative displacement of this metering piston (e.g., by valve grinding) which is a frequent cause of maladjustment. Another specific object of this invention is to make such an adjustment possible.

In general, it would be desirable to make more convenient and more accurate metering piston adjustments than possible hitherto for several reasons. In the first place, the intake valves do not all wear alike. Non-uniform wear occurs on the valves themselves, on the valve seats and on other parts having critical dimensions. Secondly, the cam lobes which operate the intake valves for the several cylinders are often somewhat dissimilar in height and in contour due to original manufacturing tolerances as well as to dissimilar wear. Thirdly, there are usually variations in vertical dimensions or elevations of various other machined parts, due to necessary machining tolerances. In conventional engines, these dissimilarities often can only be corrected by throttling the gas pressure. In some engines this can be done by means of a manifold valve provided in each cylinder. Frequently, the only solution is completely dismantling the intake valves and shimming and grinding the valve guides. The position of these guides determines the critical metering port edge positions. The operation of shimming and grinding is only a trial and error correction method. It may have to be repeated several times. Such adjustments are extremely costly and time consuming.

The present invention makes a much simpler and more accurate adjustment possible for the individual intake valve system of each cylinder. It is accomplished by a simple change in mechanical parts which will be understood more fully by considering the detailed description which follows, taken in conjunction with the accompanying drawing.

Figure 1:
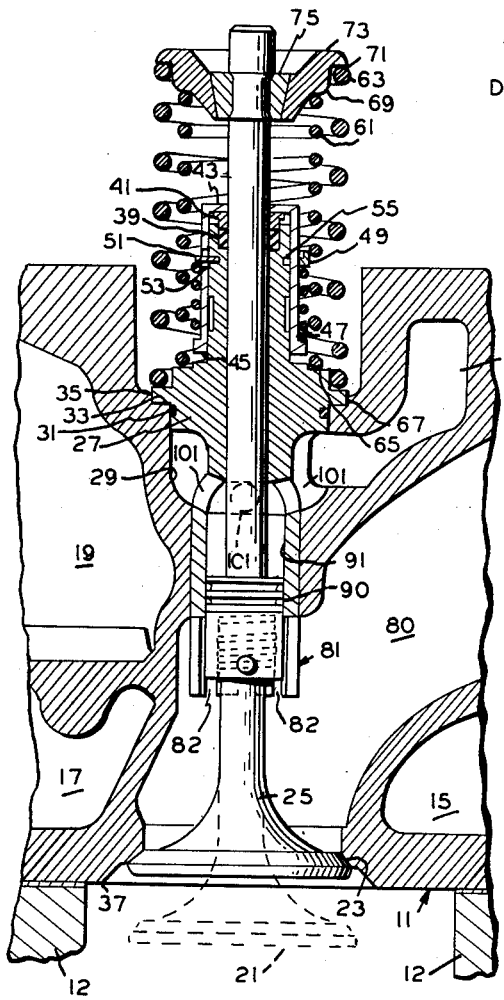
FIGURE 1 is a vertical sectional view of the intake valve and the gas metering means and associated parts of a reciprocating piston type gas engine, incorporating a preferred form of the present invention.

Referring now to the drawing, a cylinder head 11 of a typical gas engine is mounted on a combustion cylinder shown fragmentarily at 12. The cylinder head 11 may have jacket spaces or openings for coolant such as water, indicated at 15, 17, 19. A conventional piston, not shown, reciprocates in cylinder 12.

An intake valve structure comprises an intake valve head 21 which is adapted to close on a valve seat 23. Valve head 21 is carried and operated by valve stem 25 which is guided in a valve guide 27. The latter is appropriately fitted, snugly but removably, into an opening 29 formed in the cylinder head.

Valve guide 27 is sealed into opening 29 by the gas-tight, resilient O ring 31. The guide bears an enlarged flange 35, the bottom annular surface of which seats on a machined ledge 33 so that the position of the guide in vertical space, e.g., with respect to the bottom surface 37 of the cylinder head or to valve head 21 is definitely predetermined and fixed. In conventional prior art practice, shims would be provided between the bottom annular surface of flange 33 and the ledge 35 to adjust this vertical position or dimension. According to the present invention, such shimming is unnecessary but shims may be used here if desired.

The valve stem 25 extends upwardly through the guide. A packing gland is provided to seal the stem against gas leakage. This includes the packing element 39 which is held under suitable compression. The compression means include annular compressor ring 41, a packing gland cap 43 with an out-turned bottom flange 45, a compression coil spring 47 which is adapted to rest on flange 45, a spring retainer 49, and a locking lug 51, e.g., of horseshoe shape and insertable through an opening 53 in the cap 43 into annular locking groove 55 formed near the upper part of the exterior surface of the guide 27. By depressing retainer 49 to compress the spring, the locking lug 51 may be removed or replaced to disassemble or assemble the packing gland unit. The packing is such as to adjust continuously to compensate for wear of the valve stem, the guide, or the packing material itself.

Valve stem 25 is normally held in its raised or closed position by concentric springs 61, 63 seated on ledges 65, 67, respectively, of the valve guide. At the upper ends, these coil springs bear against the stepped ledge surfaces 69, 71 formed on the under surface of spring retainer 73. The latter is locked to the top of the valve stem 25 by the conventional lug or retainer element 75. The latter, of course, can be removed by depressing the retainer 73 against the force of springs 61, 63. The parts described so far are largely conventional and their operation and functioning are known in the art. The valve operating means also are conventional but are not shown.

Figure 3:
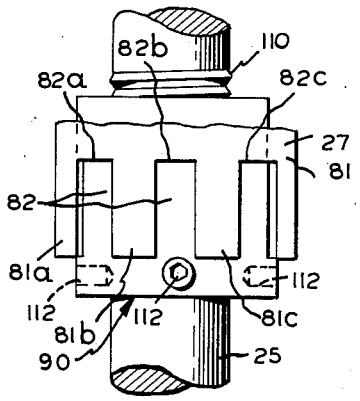
FIGURE 3 is an elevational view of the apparatus of FIGURE 2, showing certain parts in changed relative positions.

An air inlet and mixing-zone 80 surrounds the lower part of the valve stem 25. Just above this, the valve guide 27 terminates in a castellated or slotted skirt portion 81. See especially FIGURE 3. The slots 82 between projecting tongue or terminal elements 81a, 81b, 81c, etc. (see FIGURE 3) constitute collectively the metering port for the gaseous fuel which is to be admitted and mixed with the intake air. The upper ends of these slots, indicated at 82a, 82b, 82c, etc., FIGURE 3, are all in the same horizontal plane. Collectively, these surfaces 82a, etc., constitute the gas metering port "edge." The position of this "edge" is one of the critical dimensions with which this invention must deal.

Figure 2:
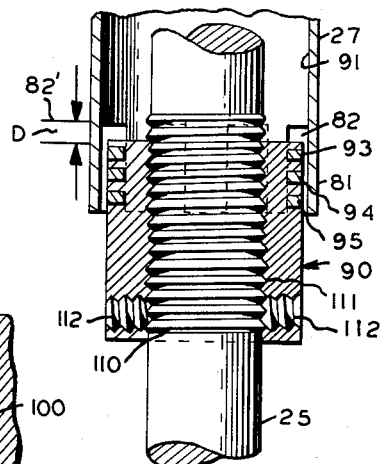
FIGURE 2 is an enlarged vertical fragmentary sectional view showing additional details of the gas metering piston and associated parts of FIGURE 1.

A piston 90, carried by the valve stem 25 but adjustable with respect thereto, it fitted for gas tight sliding movement within a smoothly machined internal cylinder wall surface 91 formed in the guide 27 just above the castellated structure 81 and the gas metering ports 82. As best shown in FIGURE 2, this piston 90 is provided with a plurality of ring grooves into which are fitted piston rings. While the number of rings may be varied as desired, and in the prior art a single ring ordinarily has been used, or sometimes two rings; three rings are preferred and are shown at 93, 94, 95, FIGURE 2. The reason for this is that the precise metering of gas at the right time, with a perfect, or as near perfect as possible, cut-off of gas except during the metering, is vital to smooth and efficient engine operation.

In FIGURE 2 the critical metering port edge level 82' is shown at the horizontal plane of the edges 82a, 82b, etc., when the valve is in its opened position (as shown in dotted lines, FIGURE 1). In this position, the gas supplied from a manifold 100 through a plurality of ports 101, FIGURE 1, flows out through the openings 82 between the castellated elements 81a, 81b, etc. The gas flow rate obviously depends on (a) the gas pressure in manifold 100, (b) the air pressure in mixing zone 80 (and in the combustion zone below valve head 21 when the valve 21 is open) and (c) the dimensions of the metering port. The lateral dimension of the metering port or ports is, of course, fixed by the combined width of the spaces 82 between the elements 81a, 81b, etc. The vertical dimension, shown at D, FIGURE 2 is determined by the distance between the metering port edge 82' and the position of the effective upper edge surface of the piston 90, i.e., the position defined by its upper ring 93. It is this dimension D which is most critical. This dimension is subject to change or variation if either the valve 21 or its seat 23 are worn or reground, assuming that piston 90 is permanently fixed to stem 25, as it is in prior art practice. Ring 93 is very near the top of the piston and in normal manufacturing procedure effectively determines its cut-off point. Of course, with a very tightly fitted piston, its actual top might be the effective upper edge.

According to the present invention, the valve stem 25 is threaded, as indicated at 110, for a portion of its length. This threaded portion should preferably be as long as or a little longer than the vertical length of piston 90. If necessary, however, it can be a little shorter. The piston 90 is threaded internally, as at 111, to cooperate with threads 110. Preferably, the threaded part of the valve stem 25 is also a little larger in diameter than the rest of the stem, to avoid unduly weakening it by the thread cutting operation and to accommodate the piston.

In order to prevent inadvertent misplacement by turning of piston 90 on stem 25, the piston is provided with locking means in the form of a plurality of set screws 112. A single set screw may suffice in some cases but it is preferred to use three or four; at least two should be used in most cases. These may conveniently be of the well known Allen type or equivalent, so that they can be set well within the surface of the piston and still be tightened adequately.

The threads 110, 111, as chosen, should not be too coarse, in order that a very fine and accurate adjustment of the piston along the stem may be obtained. By simply loosening the set screws 112 and turning the piston 90 slightly with respect to stem 25, as fine an adjustment may be obtained as is desired. The set screws 112 are reset before reassembly, in order to preserve the setting during the vibrations of engine operation.

In addition to the advantage of extreme accuracy in positioning of the piston, and hence in determining the critical dimension D for gas metering with efficient fuel consumption and engine operation, the invention has additional advantages. The multiple ring arrangement, with the upper edge of the top piston ring 93 (or the piston top where the latter is effective) serves as a precise gas cut-off. Moreover, the more effective seal provided by the multiple piston ring arrangement prevents gas leakage into the mixing zone 80 when not desired thereby increasing the efficiency of the engine. It also reduces the possibility of oil contamination by leakage of combustion gases around piston 90. It prevents leakage of valve train lubricants into the combustion zone with resulting formation of objectionable deposits. So far as the piston element is concerned, the multiple ring arrangement together with the adjustable positioning of the piston give much better control of the gas volume per stroke than was possible with prior art valves having cast or forged, roughly rounded contour surfaces above the piston ring, allowing a finer control of firing pressures and cylinder head temperatures and thereby reducing preignition and detonation (with their resulting power losses).

Because the present invention makes a much simpler and more accurate adjustment possible for the intake valve system, more effective sealing of the O ring 31 is achieved thereby preventing fuel gas flow by the O ring into the section above the valve. This improvement eliminates fire hazards in the section above the valve. Also it prevents damage to the parts above the O ring and to the entire lubricating system by reason of preventing contamination with sulfurous and other objectionable fuel constituents.

In its essentials, the invention is a very simple one. It involves primarily a continuous, convenient and precise control for dimension "D" for each intake valve. It provides a precise control at all times over the timing and volume of fuel gas flow. Although simple, the invention affords an effective solution to a serious operating problem with an important class of engines.

It will be obvious to those skilled in the art that modifications and variations can be made without departing from the spirit and purpose of the invention. It is intended by the claims which follow to cover such modifications and variations as broadly as the state of the prior art permits.

What is claimed is:

1. An improved intake valve-gas metering valve unit for gas engines of the piston operated internal combustion type which comprises, in combination, an intake valve having an integral valve stem, a metering piston containing a sealing ring groove secured to said stem at a position displaced from said valve, a gas sealing ring in said groove, means for adjusting the position of said piston on said stem, and a gas port element surrounding said piston and ring and having a critically positioned metering port edge adapted to cooperate with said piston for precise and accurate metering of fuel gas to the vicinity of said intake valve.

2. A unit according to claim 1 wherein the metering piston is adjustably threaded on the valve stem.

3. A unit according to claim 1 wherein the metering piston is threaded and also provided with locking means to hold it in adjusted position.

4. A unit according to claim 1 wherein the metering piston includes a plurality of sealing piston rings, the top one of which essentially serves as the piston metering edge to cooperate with said critically positioned port edge.

5. A fuel metering intake valve adapted to accurately meter fuel gas to a gas engine of the piston type, said valve including an intake valve having a stem, a valve guide adapted to receive said stem and provided with a gas inlet port having a critically positioned metering port edge element, a piston provided with at least one sealing ring which piston also has a critically positioned element for controlling gas flow in cooperation with said edge element, said piston being adjustably threaded on said stem for convenient relative adjustment of said critically positioned elements.

6. A fuel regulating intake valve for reciprocating gas engines and the like which comprises, in combination, a cylinder head element having an air supply duct and a gas supply duct, a valve guide mounted in said element and including a gas metering port with a critically positioned metering port edge, an intake valve including an operating stem positioned within said guide, a piston adjustably threaded on said stem and comprising a plurality of piston rings adapted to substantially prevent gas leakage and to cooperate with said guide and its port edge in accurately controlling gas flow from said gas supply duct to the air supply duct, means for locking said piston in an adjusted position on said stem, and means for sealing between said stem and guide against gas leakage, thereby to control accurately the metered supply of gas from said gas supply duct to said air supply duct.

7. A valve according to claim 6 wherein elements of the gas metering port are so positioned that the opening of the intake valve automatically meters the precise desired volume of gas from the gas supply duct to the air supply duct and an effective gas seal between said ducts whereby gas flow is essentially completely prevented at all other times.

References Cited in the file of this patent

UNITED STATES PATENTS

| | | |
|---|---|---|
| 986,754 | Podhajsky | Mar. 14, 1911 |
| 1,486,111 | Larrabee | Mar. 4, 1924 |